3,340,234
HIGH MOLECULAR WEIGHT 100% CRYSTALLINE POLYOXYMETHYLENES
Northrop Brown, Dennis Light Funck, and Carl Earle Schweitzer, Wilmington, Del., assignors to E. I. du Pont de Nemours and Company, Wilmington, Del., a corporation of Delaware
Filed May 27, 1965, Ser. No. 461,604
4 Claims. (Cl. 260—67)

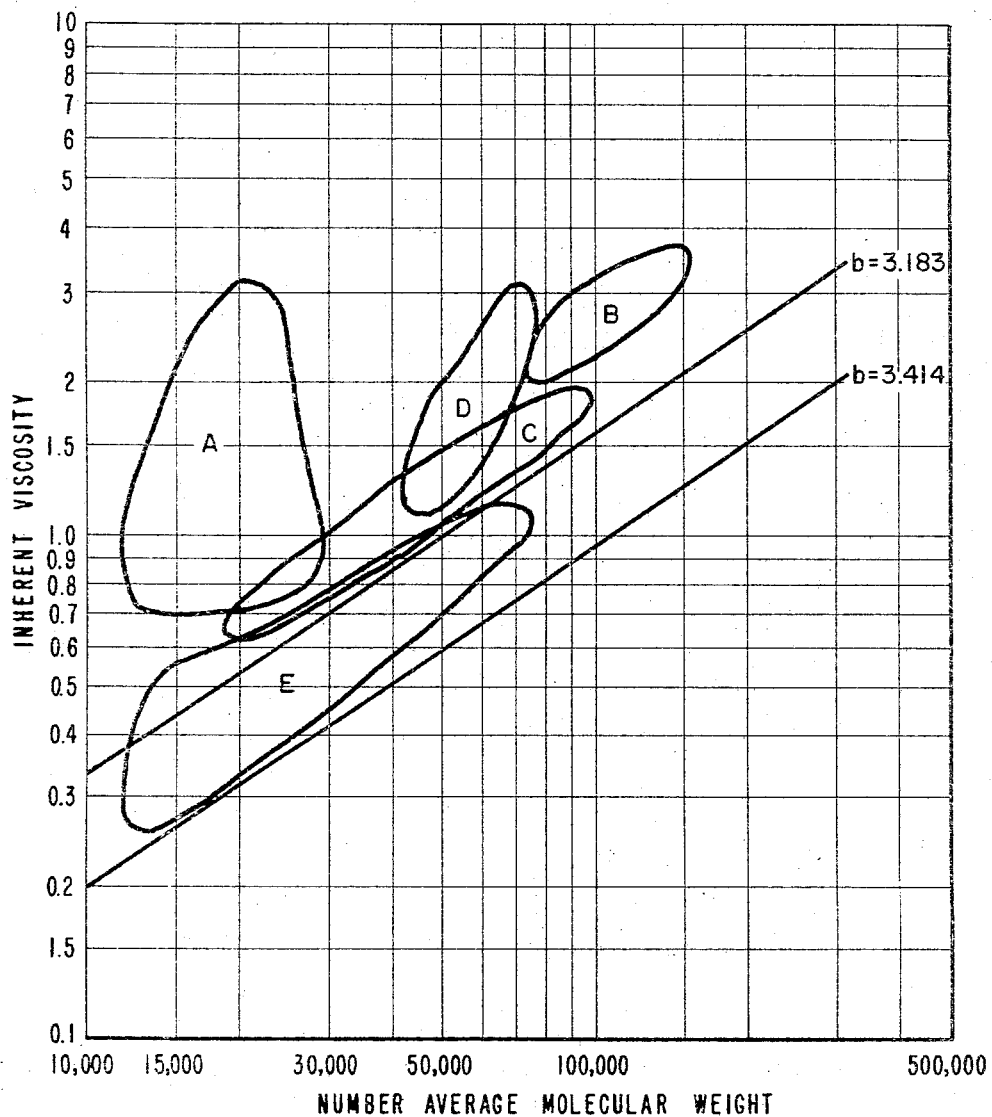

This is a continuation-in-part of our copending application Ser. No. 137,837 now abandoned, which was a continuation-in-part of our applications Ser. Nos. 700,338 and 700,339, filed Dec. 3, 1957, now U.S. Patents No. 3,000,860 and 3,000,861, respectively.

This invention relates to the preparation of high molecular weight polyoxymethylene from solutions of formaldehyde.

In U.S. Patent 2,768,994 issued to R. N. MacDonald on Oct. 30, 1956, there is described and claimed a high molecular weight polyoxymethylene which is characterized as having a "degree of toughness" of at least 1, or as having a reaction rate constant for thermal degradation at 222° C. of less than 1% by weight per minute. These characteristics differentiate the MacDonald polyoxymethylene from any prior art polyoxymethylene such as that described in H. Staudinger in "Die Hochmolekularen Organischen Verbindungen," Julius Springer, Berlin (1932) by J. F. Walker in "Formaldehyde" 2nd edition, Reinhold Publishing Corp., New York (1953), or by U.S. Patent 2,296,249 issued to P. R. Austin and C. E. Frank on Sept. 22, 1942. The procedures, described in these prior art references, for preparing polyoxymethylenes involve a high degree of purification of the formaldehyde monomer, followed by polymerization of the monomer, with or without a catalyst, in the presence of an inert liquid organic medium, such as hydrocarbon or an ether.

The polymerization of formaldehyde from an aqueous solution has heretofore always resulted in the formation of low molecular weight polymers, such as paraformaldehyde and alpha-polyoxymethylene. These polymers are usually prepared, in the case of paraformaldehyde, by distilling and concentrating the aqueous formaldehyde starting material followed by cooling the concentrate until polymeric particles settle out, and in the case of alpha-polyoxymethylene, by adding a strong acid or a strong base to a concentrated solution of formaldehyde.

Recent contributions to this field of endeavor are those reported by S. Bezzi and A. Iliceto in Chimica e l'Industrie, 33, 429–36 (1951), and by A. Iliceto, in Gazzetta Chimica Italiana, 83, 18–27 (1953). These workers studied the growth of formaldehyde polymers in aqueous formaldehyde solutions and concluded that the equilibrium relationships between the solid polymer and the liquid formaldehyde solutions were such that only polymers of limited low molecular weight could be made in such solutions.

The prior art relating to the polymerization of formaldehyde from alcoholic solutions is restricted to the formation of paraformaldehyde by precipitation, and to the use of methanol in aqueous solutions of formaldehyde to stabilize those solutions against precipitation of paraformaldehyde.

It has now been found that by employing controlled process conditions a high molecular weight polyoxymethylene may be made in an aqueous, alcoholic, or mixed aqueous-alcohols formaldehyde solution, and, furthermore, that the polyoxymethylene so prepared is substantially 100% crystalline, which is considerably higher than that of the polyoxymethylene prepared by polymerization of anhydrous formaldehyde in a hydrocarbon medium (crystallinity of 60% to 90%). It is well known, of course, that the crystallinity of a polymeric material may be changed by melting or dissolving the polymer. The crystallinity of the product of this invention is substantially 100% when the product is prepared by the process of this invention even though the crystallinity may decrease if the product is thereafter melted or dissolved. The number average molecular weight of the products of this invention is at least 15,000 and preferably at least 30,000. When esterified or etherified they have the toughness and thermal stability of the polymers described in the aforesaid MacDonald U.S. Patent 2,768,994.

The procedure used for making the crystallinity measurements as used herein is the X-ray diffraction technique reported by Hammer, Koch and Whitney in the Journal of Applied Polymer Science, vol. 1, beginning at page 170 (1959). This procedure would be expected to indicate the presence of as little as 1% of the amorphous phase.

When an aqueous solution of formaldehyde is used, the product is a polyoxymethylene glycol, $HO(CH_2-O)_nH$. When an alcohol solution of formaldehyde is used the product is a new type of polyoxymethylene having a polyoxymethylene chain with a hydroxyl group at one end and an ether group at the other, viz. $RO(CH_2-O)_nH$. When this new type is esterified, a polyoxymethylene ester-ether is produced having the formula

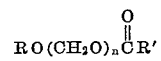

and this is also a new substance. In the above formulae R is the portion of the alcohol used as the formaldehyde solvent, that is alkyl or cycloalkyl. R' is alkyl, cycloalkyl or aryl and $n$ is at least 500. R is preferably an alkyl radical having from 1 to 5 carbon atoms per molecule.

The polymers of this invention are prepared, in general, by adjusting the temperature, pressure and formaldehyde concentration of an aqueous, alcoholic, or mixed aqueous-alcoholic formaldehyde solution containing dissolved therein a soluble basic or acidic catalyst that generates in the reaction mixture a preponderance of hydrogen ions or of hydroxyl ions, so that the solution becomes supersaturated with formaldehyde above its stability limit, whereupon polyoxymethylene seed particles form spontaneously and the solution becomes visibly cloudy, and then growing said seed particles in a reaction medium comprising said catalyst and a supersaturated formaldehyde solution, the saturation of which is below the stability limit or point above which seed particles form spontaneously under the prevailing conditions.

Our U.S. Patent 3,00,860 describes the polymerization of formaldehyde from alcohol solutions. Our U.S. Patent 3,000,861 describes the polymerization of formaldehyde from aqueous solutions. The preferred catalysts and preferred process conditions of the two types of processes, alcoholic and aqueous, differ from each other in a few minor respects. In general, the catalysts are acidic or basic substances, such as mineral acids, carboxylic acids, inorganic hydroxides, and amines. Full and complete details of the polymerization processes are given in the cited patents, and, therefore, are not repeated here.

The polyoxymethylene product of these processes is an important and interesting material and comprises the substance of this invention. The product polymer may be characterized in more than one manner. For example, the product is substantially 100% crystalline and has a number average molecular weight of at least 15,000. A related characteristic of this product is the fact that it can be made with a narrow molecular weight distribution. Still another related characteristic is the reactivity of the polymer with, for example, reagents for converting any hydroxyl groups on the ends of the polymer chain to ester groups or ether groups. Still another characteristic is its ability to enter into a coupling reaction, which makes it possible to produce high molecular weight polyoxymethylenes rapidly.

The processes of our two cited patents produce polyoxymethylenes which differ only with respect to their end-groups, i.e., the chemical groups terminating the oxymethylene chain. When an alcohol is employed in the polymerization medium, one end-group is an ether group and the other end is a hydroxyl group. In case methanol were employed as the alcohol, the ether group would be a methyl ether group, and, in case benzyl alcohol were employed, a benzyl ether group would be the end-group. When water is employed in the polymerization medium, both end-groups are hydroxyl groups. Of course, if both alcohol and water are present in the polymerization, the product polymer will be a mixture of molecules, some with hydroxyls on both ends of the polymer chain and others with an ether group on one end and a hydroxyl group on the other end of the chain. In either case, these polyoxymethylenes when prepared by the processes of our patents are substantially 100% crystalline, and, furthermore, these are the only known processes for producing these highly crystalline products. It should be pointed out that other processes produce polyoxymethylenes with the same end-groups, but not with 100% crystallinity. For example, such other products are produced by the processes of polymerizing formaldehyde in anhydrous hydrocarbon media. The crystallinity of such products may vary from about 60% to about 90%, usually about 80%.

In the capping reactions of esterification and etherification the 100% crystalline material of this invention has a higher solution temperature and usually produces a higher yield of capped product than does the same reaction with the 60-90% crystalline material.

The other evidence of higher reactivity is in the coupling reaction where uncapped polyoxymethylene molecules are caused to join or to "couple" to form larger molecules. This reaction is accomplished with relative ease when employing 100% crystalline polymer but is not accomplished to any measurable extent when employing the 60-90% crystalline material. In copending application Ser. No. 785,136 filed by Brown and Grigsby on Jan. 6, 1959, now U.S. Patent 3,192,182 there are examples showing this difference between 100% crystalline polyoxymethylene and 60-90% crystalline polyoxymethylene. In a more recent series of such reactions this difference was confirmed again. In this series 100% crystalline polyoxymethylene made by the process of our U.S. Patent 3,000,860 was subjected to the action of boron trifluoride or other similar Lewis acid, and the reaction product was found to have a higher inherent viscosity or a higher number average molecular weight or both than the polyoxymethylene employed as the starting material. For example, a 100% crystalline polyoxymethylene was treated with the vapors of the complex of boron trifluoride and dimethyl ether in a stream of nitrogen gas at 160° C. for 5 minutes. The product was then ester-capped by treatment with propionic anhydride. Another portion of the starting material was ester-capped with propionic anhydride, but was not subjected to the treatment with boron trifluoride. This control polymer had an inherent viscosity of 0.73 and a number average molecular weight of 39,000. The product after the above-described treatment with boron trifluoride had an inherent viscosity of 1.35 and a number average molecular weight of 58,100. The yield of final product based on the starting material was 93%. In contrast to the above reaction involving 100% crystalline polyoxymethylene, the same treatment was given to 60-90% crystalline polyoxymethylene with the result that the control polymer had an inherent viscosity of 1.09 and a number average molecular weight of 44,000, and the polymer treated in the boron trifluoride had an inherent viscosity of 0.57 and a number average molecular weight of 17,000. Other experiments, some involving other Lewis acids, have shown identical comparisons; that is, the 100% crystalline polyoxymethylene is successfully coupled while the 60-90% crystalline polyoxymethylene is not successfully coupled and usually is degraded. It is readily apparent to those skilled in the art that this coupling characteristic is extremely valuable, since it permits one to produce large molecules from small ones in a matter of minutes rather than hours.

One of the most important characteristics of the 100% crystalline polyoxymethylene is that it is the forerunner to a polyoxymethylene with an extremely narrow molecular weight distribution, which in mathematical terms is the ratio of the weight average molecular weight ($M_w$) to the number average molecular weight ($M_w$). In practically all cases it is a goal of the polymer chemist to produce for any given polymer the narrowest molecular weight distribution, or, with reference to the above mathematical terms, the lowest ratio of weight average molecular weight to number average molecular weight. This goal is not merely an academic goal because, from a practical point of view, it means that for a given level of strength properties, e.g. tensile strength, toughness, etc., one obtains the greatest melt fluidity in the polymer. (The melt viscosity of the polymer increases with increasing weight average molecular weight and the physical toughness increases with increasing number average molecular weight.) Thus, it may be seen that unless a polymer can be produced with a narrow molecular weight distribution, it is somewhat difficult to product a polymer which is strong enough (high $M_n$) to be useful for its intended application and yet be sufficiently fluid in the molten state (low in $M_w$) to be injection molded. It is clear, therefore, that an ability to control molecular weight distribution provides the polymer manufacturer with a considerable amount of freedom to produce products with various combinations of properties.

From a theoretical point of view the absolute lower limit to the molecular weight distribution of a polymer is when the ratio of $M_w:M_n$ is unity. This limit is never reached practically because it would require that in any given batch of polymer each molecule was identical in size and structure to every other molecule, and the tools of modern science are, as yet, unable to control polymerization to such a fine degree. A practical approach to this limit, however, is highly desirable, and for the field of polyoxymethylenes the present invention provides the greatest progress yet made.

A graphical picture of various types of polyoxymethylenes is shown in the attached drawing. The drawing is a plot of the relationship of inherent viscosity (which is related to, but more conveniently measured than, melt viscosity) to number average molecular weight for about 60 different polymers selected at random. Area A in the drawing encompasses those polyoxymethylenes made by the polymerization of anhydrous formaldehyde in hydrocarbon media employing catalysts which are metalorganic as described in U.S. Patent 2,848,437 which issued Aug. 19, 1958, to Langsdorf et al. or catalysts which are trihydrocarbon phosphines, arsines or stibines, as described in U.S. Patent 2,828,286 which issued Mar. 25, 1958, to MacDonald.

Area B represents the polyoxymethylenes made by polymerizing anhydrous formaldehyde in the presence of metallic carbonyls as catalysts. This process is described in U.S. Patent 2,734,889 which issued Feb. 14, 1956, to Starr.

Area C represents the polyoxymethylenes made by polymerizing anhydrous formaldehyde in the presence of quaternary ammonium salts as catalysts. This process is described in U.S. Patent 2,994,687 which issued Aug. 1, 1961, to Goodman et al.

Area D represents polyoxymethylenes made by various processes other than those described above. For example, there is included in this area polyoxymethylenes made by polymerizing trioxane in an anhydrous system.

Area E represents the polyoxymethylenes made by polymerizing formaldehyde in aqueous or alcoholic solutions employing acids or bases as catalysts. These processes are described in our U.S. Patents 3,000,860 and 3,000,861.

The polymers in Areas A, B, C, and D are crystalline to the extent of 60-90%. The polymers of Area E are 100% crystalline when first produced. The fact that Area E overlaps Area C is not a contradiction of the fact that Area E is 100% crystalline while Area C is 60-90% crystalline since crystallinity has no bearing upon inherent viscosity and number average molecular weight. A large part of Area E represents the products of this invention.

The property of narrow molecular weight distribution ($M_w:M_n$) is particularly apparent from this drawing. As one moves to the lower right portion of the drawing the molecular weight distribution becomes narrower. Thus, at a given inherent viscosity a polymer with a higher number average molecular weight has a narrower molecular weight distribution than one of a lower number average molecular weight. Similarly, at a given number average molecular weight a polymer of a lower inherent viscosity has a narrower molecular weight distribution than one of a higher inherent viscosity. Up to the time of the inventions of our U.S. Patents 3,000,860 and 3,000,861 the type of polyoxymethylene which had the narrowest molecular weight distribution was that made by employing quaternary ammonium salts as catalysts (Area C in the drawing).

The products of this invention are, in their initial state, 100% crystalline and have a number average molecular weight of at least 15,000, which is about the threshold for tough, moldable, polyoxymethylenes. When these 100% crystalline polyoxymethylenes are end-capped to replace the terminal hydroxyl group with an ester group or an ether group the resulting polymer can be subjected to the measurement of inherent viscosity and number average molecular weight with all the care required to obtain meaningful results. These end-capped products were plotted on a graph to produce the picture illustrated in the attached drawing. The actual measurement of these properties on uncapped polyoxymethylene, particularly 100% crystalline polyoxymethylene, is plagued with degradation of the polymer, and, therefore, one must report to correlations to produce meaningful determinations.

Measurements of this type were made on capped polyoxymethylenes made by polymerizing anhydrous formaldehyde in several systems such as those of Areas A, B, C, and D of the attached drawing. By drawing the best straight line through comparable data, i.e., data from the same polymerization process, it was found that the straight line had the same slope as those on the drawing, the equation of such a straight line being $$\log N_i = 0.680 \log M_n - b$$

where $N_i$=inherent viscosity and $M_n$=number average molecular weight. The two parallel lines on the drawing represent those described by the above equation but where $b=3.183$ and $b=3.414$. These lines include those polymers in Area E which are not also in Area C, and, furthermore, they represent those polyoxymethylenes having the narrowest molecular weight distribution known, estimated to be between 1 and 2. The minimum molecular weight for the purposes of this invention is 15,000, which is some considerable amount above the minimum that might have any conceivable utility. The specification of a maximum molecular weight is not necessary since higher and higher molecular weights could be utilized with more powerful molding machines or some other way of overcoming higher and higher melt viscosities. A practical upper limit, for purposes of a preferential range, is about 100,000.

In the examples which follow, the above-described polyoxymethylenes are illustrated. Percentages and proportions are by weight, unless otherwise noted. The procedures for determining the degree of toughness and the reaction rate constant for thermal degradation are described in U.S. Patent 2,768,994 issued to R. N. MacDonald on Oct. 30, 1956.

Number average molecular weight may be measured by the conventional procedures of onometry. However, it has been found that infrared analysis provides an accurate method of measuring the amount of end-group and the amount of oxymethylene chain which is present in a sample of the polyoxymethylene. Furthermore, chemical analytical methods are available to determine the type and quantity of end-groups. These procedures are well known to those skilled in the art, and, furthermore, are described in our U.S. Patents 3,000,860 and 3,000,861.

Inherent viscosity may be measured by any convenient solvent and at any convenient temperature and concentration. In this specification it has been measured at 90° C. on a solution of 0.5 gram of polymer dissolved in 100 ml. of phenol.

The following examples illustrate various embodiments of this invention, but are not intended to be limiting upon its scope.

*Example 1*

This example illustrates the employment of the base/diluent catalyst system incorporating the low-temperature method of seed preparation as described in our U.S. Patent 3,000,861. The catalyst recipe by weight was 0.39 N-ethylpiperidine/3.11 dioxane/1.0 water.

A solution was prepared at 100° C. containing the following ingredients, and having a pH of about 9.5:

|  | Grams |
|---|---|
| 73.2% aqueous formaldehyde | 350.0 |
| Water | 26.9 |
| N-ethylpiperidine | 47.1 |
| Dioxane | 376.0 |

This solution was placed in a bath at 80° C. and found, by analysis, to contain 32.1% by weight of formaldehyde. A 100 ml. portion of this solution was placed in a 1-liter volumetric flask, which, in turn, was placed in a bath at 40° C. for 30 minutes. The flask was then placed in a bath at 80° C. and there was added to the contents of the flask the remainder of the above solution plus an additional 86 grams of a solution containing water, N-ethylpiperidine, and dioxane (but no formaldehyde) in the above ratio. The calculated formaldehyde content of the resulting solution (not including the formaldehyde in polymeric form) was 28.9% and the concentration found by analysis was 28.4%. The equilibrium concentration of this system was 24.6% formaldehyde. This solution was maintained at 80° C. without agitation for 23.3 hours, at the end of which time the formaldehyde concentration of the reaction medium had fallen to 25.4%. The reaction medium was added to 4 liters of dioxane at room temperature, and the product polymer was filtered, washed with acetone and oven-dried. The product was 38.1 grams of polyoxymethylene having a number average molecular weight of 17,000. The polymer, when studied using X-ray diffraction techniques, showed no detectable amount of amorphous material and thus is considered 100% crystalline. A comparison polymer was produced by the procedure set forth in U.S. Patent 2,994,687 using a quaternary ammonium polymerization initiator, dimethyldi (hydrogenated tallow)ammonium acetate. This polymer was found to contain 7.5% amorphous material and thus was only 92.5% crystalline.

A portion of the polymer product produced in the foregoing example was then mixed with an amount of freshly prepared reaction medium having the above recipe proportions of N-ethylpiperidine/dioxane/water and a formaldehyde concentration as indicated in Table 1. Each succeeding cycle used a portion of the product polymer from the preceding cycle.

37% by weight of formaldehyde. After 67.9 hours of reaction period at 80° C. the formaldehyde content had fallen to 29.3% and the polyoxymethylene product isolated from the system weighed 264 grams and had a number average molecular weight of 18,000.

In a succession of three more cycles, using as the feed polymer for each cycle a portion of the product polymer from the preceding cycle, the above-described polyoxymethylene product was subjected to isothermal conditions promoting further growth of the polymer. The conditions of the succeeding cycles are listed in Table 2.

TABLE 1

|  | Cycle 2 | Cycle 3 | Cycle 4 | Cycle 5 |
| --- | --- | --- | --- | --- |
| Amount of liquid reaction medium at beginning of cycle, gm | 721 | 437 | 337 | 311 |
| Formaldehyde concentration in liquid reaction medium at beginning of cycle, percent | 28.9 | 27.7 | 26.6 | 26.7 |
| Formaldehyde concentration in liquid reaction medium at end of cycle, percent | 27.7 | 26.5 | 25.7 | 36.0 |
| Amount of solid polymer in reaction medium at beginning of cycle, gm | 7.28 | 7.28 | 5.46 | 5.46 |
| Amount of solid polymer in reaction medium at end of cycle, gm | 17.2 | 10.97 | 6.70 | 6.35 |
| Number average molecular weight of polymer at end of cycle | 29,000 | 33,000 | 36,000 | 41,000 |
| Time of reaction period per cycle, hrs | 25.0 | 26.4 | 45.4 | 46.1 |

The product of cycle 5 in Table 1 was acetylated by treatment with acetic anhydride and found to have a reaction rate constant for thermal degradation at 222° C. of 0.13% by weight per minute, and to have a degree of toughness of at least 1. The acetylated product exhibited an inherent viscosity of 0.78 and a number average molecular weight of 37,500.

A series of growth cycles paralleling those of Table 1 were run in which the formaldehyde concentration in the liquid reaction medium at the beginning of the third cycle was 26.8%, at the beginning of the fourth cycle was 26.9%, and at the beginning of the fifth cycle was 26.8%. Otherwise, the cycle reaction conditions were the same as those shown in the table. The final product from the fifth cycle had a number average molecular weight of 45,000.

*Example 2*

This example illustrates the use of a base/diluent catalyst employing the isothermal method of seed formation as described in our U.S. Patent 3,000,861. The catalyst recipe by weight was 0.25 dimethylaminoethanol/1 formaldehyde, and the diluent recipe by weight was 3 dioxane/1 water.

A solution was prepared in a 5-liter flask at 80° C. with the following ingredients, the resulting pH being 8.8–9.0:

| | Grams |
| --- | --- |
| 75.0% aqueous formaldehyde | 1112 |
| Dioxane | 864 |
| 2-dimethylaminoethanol | 209 |

This solution analyzed 38.2% by weight of formaldehyde. The equilibrium concentration at these reaction conditions was 28.8% by weight of formaldehyde and the stability limit was in the general range of about 33%–

TABLE 2

|  | Cycle 2 | Cycle 3 | Cycle 4 |
| --- | --- | --- | --- |
| Amount of liquid reaction medium at beginning of cycle, gm | 2,865 | 1,990 | 1,734 |
| Formaldehyde concentration in liquid reaction medium at beginning of cycle, percent | 33.1 | 31.4 | 30.2 |
| Formaldehyde concentration in liquid reaction medium at end of cycle, percent | 29.9 | 30.0 | 29.4 |
| Amount of solid polymer in reaction medium at beginning of cycle, gm | 41.0 | 26.0 | 26.0 |
| Amount of solid polymer in reaction medium at end of cycle, gm | 112.1 | 38.0 | 30.3 |
| Number average molecular weight of polymer at end of cycle | 30,000 | 36,000 | 41,000 |
| Time of reaction period per cycle, hrs | 74.2 | 70.6 | 71.8 |

The product of cycle 4 was acetylated by reaction with acetic anhydride and the resulting acetylated polyoxymethylene exhibited a degree of toughness of at least 1 and a reaction rate constant for thermal degradation at 222° C. of 0.46% by weight per minute. The acetylated product exhibited an inherent viscosity of 0.71 and a number average molecular weight of 35,000 by infrared analysis.

*Example 3*

A clear solution was prepared at 105° C. containing the following components:

| | Grams |
| --- | --- |
| Formaldehyde | 722 |
| Methanol | 231.4 |
| N-ethylpiperidine | 29.0 |
| 85% phosphoric acid | 23.6 |

By the sulfite method of analysis, the above solution contained 71.9% by weight formaldehyde. The solution had a pH of 5.2–5.3. A portion (20 ml.) of the above solution was placed in a flask, which in turn was cooled for 5 minutes in a bath maintained at 60° C., followed by 5 minutes in a bath at 85° C. During this period of 10 minutes the clear solution became cloudy because of the precipitation of seed particles of low molecular weight polyoxymethylene. The flask containing the cloudy solution was then placed in a constant temperature bath at 105° C., 400 ml. of the above-described clear solution was added to the flask, and the entire contents were subjected to continuous agitation. The equilibrium concentration of this system at 105° C. was 68.7% by weight of formaldehyde.

The flask and its agitated contents were maintained at 105° C. for three days with an analysis being made daily and with the daily addition of a portion of a freshly prepared solution similar to that described above, except that the formaldehyde content was slightly less for each succeeding day's portion.

At the end of the first day, an analysis of a 25 ml. sample of the flask contents indicated that the liquid analyzed 70.7% by weight of formaldehyde and that the solid particles were polyoxymethylene molecules having a number average molecular weight of 21,000 by infrared analysis for hydroxyl groups. The sample was isolated by adding a 25 ml. sample of the flask contents to 10 ml. of hot water, filtering, washing the precipitate with hot water, then with room temperature water, and finally with acetone. The solid precipitate was then dried and analyzed. A freshly prepared solution of the above four ingredients was prepared having the same weight ratio of methanol/N-ethylpiperidine/85% phosphoric acid, but a smaller amount of formaldehyde such that the solution analyzed 71.1% by weight formaldehyde. A volume of 250 ml. of this freshly prepared solution was added to the flask after the 25 ml. sample had been removed for analysis.

At the end of the second day, two samples (200 ml. and 25 ml.) were removed from the flask and analyzed as described above, and the findings indicated that the liquid contained 69.7% by weight of formaldehyde and that the polyoxymethylene molecules had grown to a number average molecular weight of 31,000 and 30,000, as judged by the respective samples. A volume of 400 ml. of a freshly prepared solution of the above four ingredients was then added to the flask. This added solution again contained the same weight ratio of methanol/N-ethyl-piperidine/85% phosphoric acid and a smaller amount of formaldehyde such that the added solution analyzed 69.7% by weight of formaldehyde.

At the end of the third day the liquid in a 25 ml. sample analyzed 68.8% by weight of formaldehyde and the polyoxymethylene molecules had a number average molecular weight of 33,000. The entire contents of the flask were removed and the polymer particles isolated in the amount of 17.7 grams, and the number average molecular weight of the polymer was 34,000. A sample of this polymer was acetylated by treatment with acetic anhydride in the presence of sodium acetate as a catalyst. The acetylated product had a number average molecular weight of 36,000, an inherent viscosity of 0.65, and a reaction rate constant for thermal degradation at 222° C. of 0.11% by weight per minute. Several portions of the acetylated product were pressed into films 3.0–3.7 mils in thickness and found to have a degree of toughness of at least 1. Some of these portions of acetylated polymer were treated with 1% by weight of a polyamide as a thermal stabilizer and 0.2% by weight of a phenolic antioxidant prior to being pressed into films, and the resulting film also had a degree of toughness of at least 1. One portion of the polyoxymethylene was alkylated rather than acetylated. The alkylation was accomplished by treating the polymer with methylal and sulfuric acid, followed by removal of any unreacted polymer. The reaction rate constant for thermal degradation at 222° C. for this alkylated polymer was 0.37% by weight per minute, and films 3–6 mils in thickness had a degree of toughness of at least 1.

*Example 4*

A clear solution was prepared containing the following ingredients:

| | Grams |
|---|---|
| 54.5% solution for formaldehyde in sec.-butyl alcohol | 231.5 |
| Sec.-butyl alcohol | 8.0 |
| N-ethylpiperidine | 13.6 |
| Glacial acetic acid | 9.6 |

The 54.5% solution of formaldehyde in sec.-butyl alcohol was prepared by bubbling anhydrous formaldehyde into sec.-butyl alcohol at 80° to 100° C. The analysis of the solution, after the addition of N-ethylpiperidine and acetic acid, indicated a formaldehyde content of 48.0% by weight. The final solution had a pH of 7.2. A 10 ml. portion of this solution was placed in a flask, which, in turn was placed in a constant temperature bath. The flask and its contents were maintained at 25° C. for 20 minutes, at 60° C. for an additional 25 minutes, and, finally, at 80° C. for an additional 30 minutes. During this treatment the clear solution turned somewhat cloudy due to the precipitation and growth of polyoxymethylene particles of low molecular weight. The flask and its contents were then placed in a bath at 95° C. and 60 ml. of the above-described clear solution was added. There also was added 3.7 ml. of a solution of sec.-butanol, N-ethylpiperidine, and glacial acetic acid in the same weight proportions as given above with respect to the clear solution. The formaldehyde concentration of the final contents of the flask was calculated to be 46.0% by weight, exclusive of the formaldehyde forming the polyoxymethylene chains. The equilibrium concentration of this system at 95° C. was 42.0% by weight of formaldehyde.

After 2.88 days at the above temperature, the liquid in the flask analyzed 44.3% by weight formaldehyde. The contents of the flask were treated so as to isolate the polymer particles, in the same manner as described in Example 3 except that alcohol was used in place of water. The solid product weighed 1.001 grams and had a number average molecular weight of 18,000 by infrared analysis. The recovery and isolation of the polymer were accomplished at room temperature by adding 3 volumes of dioxane to the volume of the flask contents, filtering, washing twice with a 1:1 volume ratio of sec.-butanol: dioxane, washing twice with acetone, and drying. This product was acetylated by treatment with acetic anhydride in the presence of sodium acetate and the acetylated product exhibited a reaction rate constant for thermal degradation at 222° C. of 0.13% by weight per minute. The acetylated product exhibited an inherent viscosity of 0.52 and a number average molecular weight of 19,000.

*Examples 5–48*

A series of polymerization runs was made employing N-ethylpiperidine as a catalyst in a solution of formaldehyde in methanol. The composition of the polymerization medium in all runs was within the following ranges:

| | Percent by weight |
|---|---|
| Formaldehyde | 69–78 |
| N-ethylpiperidine | 0.3–2.0 |
| Methanol | Remainder |

The polymerization was accomplished in substantially the same fashion as described in the preceding examples, by cooling the above-described polymerization medium to produce seed particles of polyoxymethylene, and then permitting the seed particles to grow in that same polymerization medium at temperatures from about 90° C. to about 110° C. In each individual run the composition of the polymerization medium and the polymerization temperature were generally held at constant values over substantial periods of time during the experiment.

The resulting polyoxymethylene product was treated with a carboxylic acid anhydride (either acetic anhydride or propionic anhydride) to esterify the hydroxyl groups of the polymer and the esterified product was analyzed to determine its inherent viscosity and molecular weight, which are listed in Table 3 in comparison to polymers A and B which are typical of those in Area C of the attached drawing.

TABLE 3

| Example No. | Inherent Viscosity | Flow Number | Number Average Molecular Weight | Relative Notched Izod Impact Strength |
|---|---|---|---|---|
| 5 | 0.78 | | 29,300 | |
| 6 | 0.76 | | 29,300 | |
| 7 | 0.485 | | 13,800 | |
| 8 | 0.475 | | 13,800 | |
| 9 | 0.504 | | 20,400 | |
| 10 | 0.465 | | 24,200 | |
| 11 | 0.574 | | 25,100 | |
| 12 | 0.693 | | 35,200 | |
| 13 | 0.681 | | 35,200 | |
| 14 | 0.45 | | 10,700 | |
| 15 | 0.66 | | 33,200 | |
| 16 | 0.659 | | 35,400 | |
| 17 | 0.64 | | 33,900 | |
| 18 | 0.715 | | 40,800 | |
| 19 | 0.732 | | 39,200 | |
| 20 | 0.76 | | 48,200 | |
| 21 | 0.85 | | 45,500 | |
| 22 | 0.646 | | 37,700 | |
| 23 | 0.828 | | 29,600 | |
| 24 | 0.801 | | 43,600 | |
| 25 | 0.959 | | 45,600 | |
| 26 | 0.774 | | 30,500 | |
| 27 | 0.886 | 13.2 | 54,800 | 0.97 |
| 28 | 0.694 | | 41,600 | |
| 29 | 0.733 | | 43,600 | |
| 30 | 0.844 | | 47,500 | |
| 31 | 0.911 | | 45,500 | |
| 32 | 0.874 | | 40,800 | |
| 33 | 0.954 | | 40,500 | |
| 34 | 1.000 | | 43,600 | |
| 35 | 0.714 | | 27,200 | |
| 36 | 0.718 | | 33,200 | |
| 37 | 0.580 | | 30,400 | |
| 38 | 0.758 | | 25,600 | |
| 39 | 0.782 | | 24,000 | |
| 40 | 0.98 | 7.9 | 54,300 | 1.14 |
| 41 | 0.98 | | 54,300 | |
| 42 | 0.811 | | 43,200 | |
| 43 | 0.740 | | 39,500 | |
| 44 | 0.780 | | 39,400 | |
| 45 | 0.713 | | 40,700 | |
| 46 | 0.810 | | 45,200 | |
| 47 | 0.843 | | 46,800 | |
| 48 | 0.707 | | 41,800 | |
| A | 1.03 | 5.0 | 40,000 | 1.00 |
| B | 0.92 | 8.5 | | 0.87 |

As a comparison of the toughness and melt fluidity of the polymers of this invention with those made by previously known processes, the flow number and relative Izod Impact Strengths were measured on the polymers of Examples 27, 40, and the control polymers A and B. The flow number is an arbitrary number related to melt viscosity in such a manner that higher flow numbers correspond to more fluidity (or lower melt viscosity). The Izod Impact Strength was measured on notched samples in the manner well known to the industry. The Izod values were then converted to be relative to unity for control polymer A. These data show that the polymers of this invention have a higher melt fluidity (flow number) at no sacrifice in toughness (Izod) than do the polyoxymethylenes of the prior art.

The polymers of this invention are particularly useful in the production of all types of shaped articles such as fibers, films, filaments, piping, tubing, rods, and irregularly shaped objects.

We claim:
1. A polyoxymethylene which is substantially 100% crystalline, has a number average molecular weight of at least 15,000, and has the formula:

$$HO-(CH_2O)_n-R$$

wherein R is selected from the group consisting of hydrogen, alkyl groups of 1–5 carbon atoms, alkoxyalkyl groups of 2–7 carbon atoms, cycloalkyl groups of 6–8 carbon atoms, and aralkyl groups of 7–16 carbon atoms.

2. The polymer of claim 1 which has a number average molecular weight not in excess of 100,000.

3. A polyoxymethylene having the terminal portions of its polymer chain being selected from the group consisting of ester groups and ether groups, and having an inherent viscosity and a number average molecular weight which satisfies the equation $$\log N_i = 0.680 \log M_n - b$$

wherein $N_i$ is the inherent viscosity of the polyoxymethylene measured at 90° C. on a solution of 0.5 gram of said polyoxymethylene in 100 ml. of phenol; $M_n$ is the number average molecular weight of said polyoxymethylene with a value of at least 15,000; and $b$ is a number between 3.183 and 3.414; said polyoxymethylene resulting from the etherification of the polyoxymethylene of claim 1.

4. A polyoxymethylene having the terminal portions of its polymer chain being selected from the group consisting of ester groups and ether groups, and having an inherent viscosity and a number average molecular weight which satisfies the equation $$\log N_i = 0.680 \log M_n - b$$

wherein $N_i$ is the inherent viscosity of the polyoxymethylene measured at 90° C. on a solution of 0.5 gram of said polyoxymethylene in 100 ml. of phenol; $M_n$ is the number average molecular weight of said polyoxymethylene with a value of at least 15,000; and $b$ is a number between 3.200 and 3.410; said polyoxymethylene resulting from the esterification of the polyoxymethylene of claim 1.

References Cited

UNITED STATES PATENTS

| | | | |
|---|---|---|---|
| 2,768,994 | 10/1956 | MacDonald | 260—67 |
| 2,952,878 | 9/1960 | Swerlick et al. | 260—67 |
| 2,994,687 | 8/1961 | Goodman et al. | 260—67 |
| 2,998,409 | 8/1961 | Nogare et al. | 260—67 |
| 3,000,860 | 9/1961 | Brown et al. | 260—67 |
| 3,000,861 | 9/1961 | Brown et al. | 260—67 |

OTHER REFERENCES

Gaylord et al.: Linear and Stereoregular Addition Polymers (1959), Interscience Pub., N.Y., page 55.

Hammer et al.: Journal of Applied Polymer Science, vol. I, Issue No. 2, pages 169–178 (1959).

Kunststroffe: vol. 53(7), July 1963, pp. 11–21, English translation form ibid., pp. 424–36.

WILLIAM H. SHORT, *Primary Examiner.*

L. M. PHYNES, *Assistant Examiner.*